Sept. 17, 1974  J. E. LOVELOCK  3,836,449
ELECTROLYTIC CELL FOR USE WITH VAPOR PHASE DETECTORS
Original Filed June 1, 1970  3 Sheets-Sheet 1

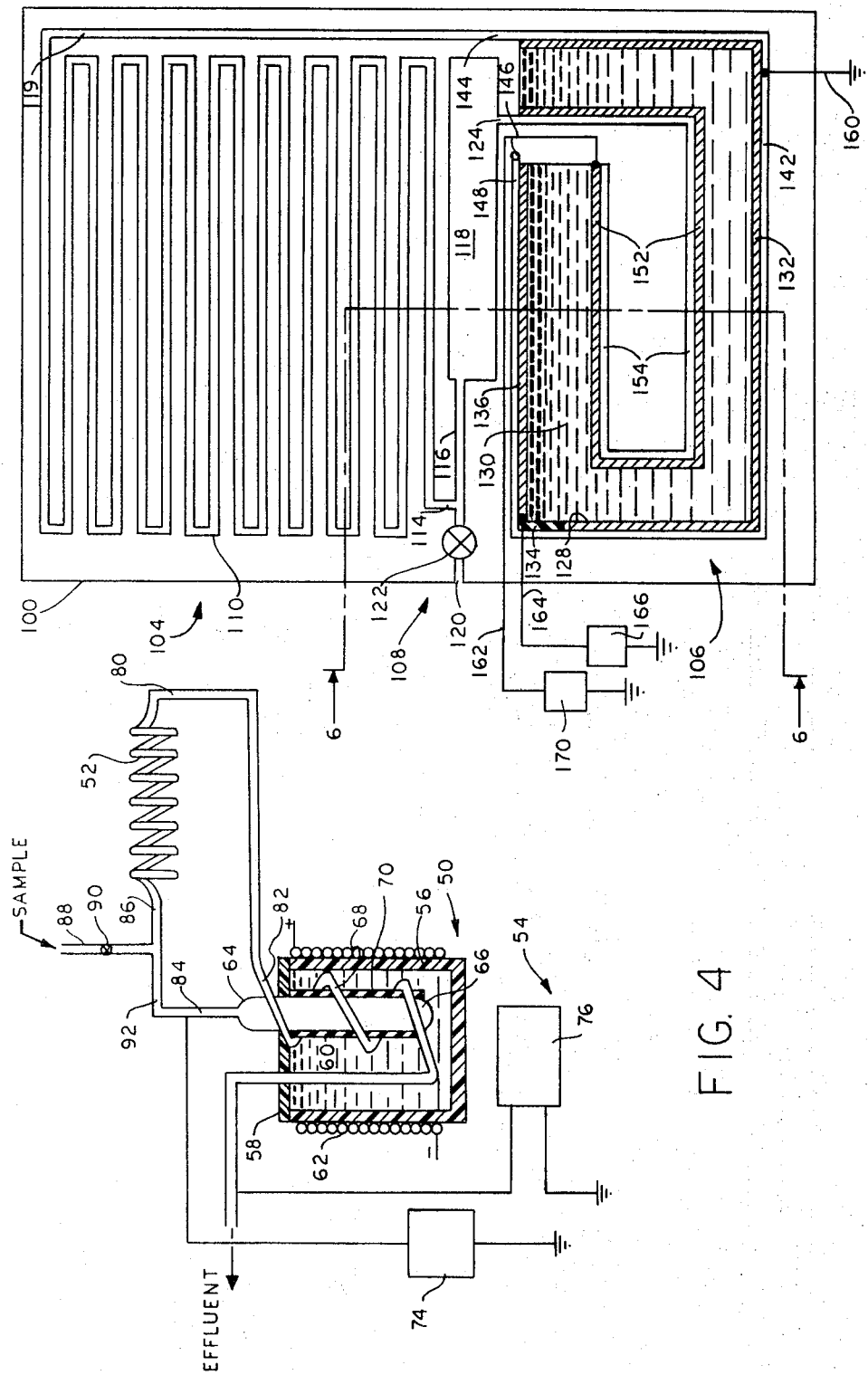

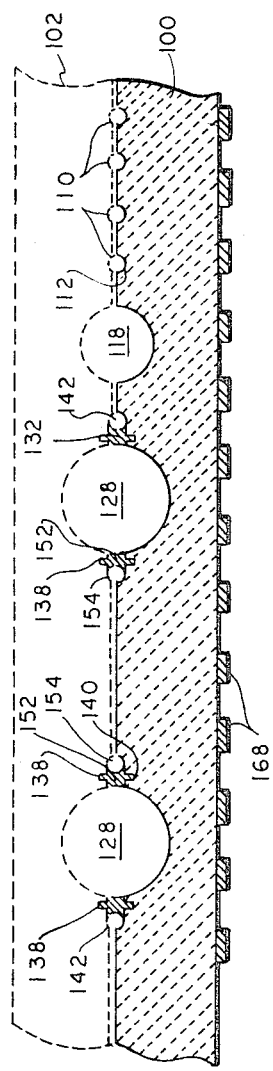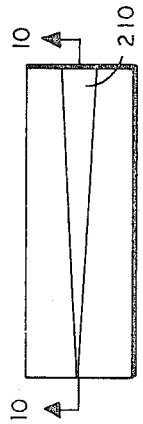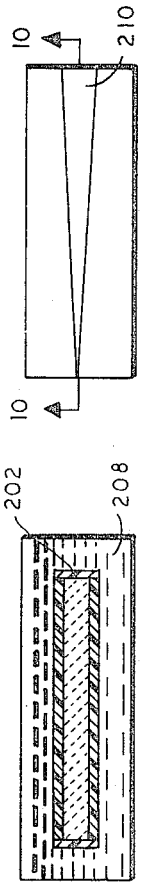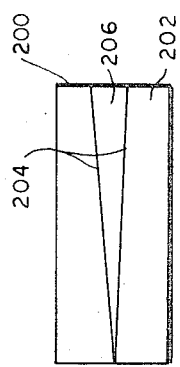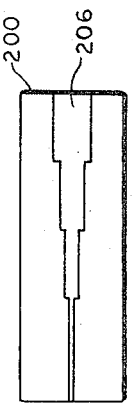

… … …

United States Patent Office 3,836,449
Patented Sept. 17, 1974

3,836,449
ELECTROLYTIC CELL FOR USE WITH VAPOR PHASE DETECTORS
James E. Lovelock, Bowerchalke, near Salisbury, England, assignor to California Institute of Technology, Pasadena, Calif.
Original application June 1, 1970, Ser. No. 41,905, now Patent No. 3,701,632. Divided and this application Oct. 26, 1972, Ser. No. 300,908
Int. Cl. B01k 3/00; C23f 1/02; G03c 5/00
U.S. Cl. 204—277          7 Claims

ABSTRACT OF THE DISCLOSURE

The change in potential difference, resistance or current flow between electrodes in an electrolytic cell is utilized to detect pressure change, absolute hydrogen pressure and pressure of other gases present in hydrogen carrier gas, particularly those which are reactive with the electrodes. At least one of the electrodes is formed of a material selectively permeable to hydrogen, preferably comprising palladium. The cell may be simultaneously utilized for separation and regeneration of hydrogen carrier gas and may be conveniently integrated and combined with a gas chromatographic column on a small size chip containing recesses for the cell and column components formed by conventional etching-masking techniques.

---

This is a division of application Ser. No. 41,905, filed June 1, 1970, now U.S. Pat. No. 3,701,632.

ORIGIN OF THE INVENTION

The invention described herein was made in the performance of work under a NASA contract and is subject to the provisions of Section 305 of the National Aeronautics and Space Act of 1958, Public Law 85–568 (62 Stat. 435; 42 U.S.C. 2457).

BACKGROUND OF THE INVENTION (1) Field of the Invention

The present invention relates to apparatus and methods for analyzing gas samples, and more particularly, to a compact and efficient detector and gas chromatographic system for analysis of vapor phase constituents of microsize samples.

(2) Description of the Prior Art

Detectors such as the gas density balance, the thermal conductivity and ionization cross-section provide a signal related to the concentration of the component to be analyzed. Consequently, any variation in flow rate through these detectors is followed by a corresponding change in the sample concentration. The detector faithfully follows these changes in sample concentration but the time integral of the signal will not be an accurate measure of the quantity injected into the system.

Thus, though, these detectors are reliable in isolation, they do not easily yield accurate analysis when incorporated as components in a gas chromatograph. The conditions for accurate analysis with these otherwise excellent detectors, are therefore limited to those in which the carrier gas flow rate can be maintained strictly constant. This means that in practice convenient procedures such as temperature or flow programming of the column, which almost inevitably are accompanied by some change in column flow rate, are accompanied by reduced accuracy of analysis. With these concentration sensitive detectors, flow programming and accurate analysis are essentially incompatible. Further, the sample vapor constituents are usually so greatly diluted by the much larger quantity of carrier gas necessary for operation of the chromatographic column that they may be difficult or impossible to detect. Moreover, the pressure and flow rate of the effluent emerging from the chromatograph column may exceed the capability of the detector.

The considerable improvement in analytical capability which may be derived from the combination of gas chromatography and mass spectrometry (GC-MS), has encouraged the development of various interface devices, or as they are more commonly called, molecular separators. These devices serve primarily as pressure reduction systems by selectively diminishing the total mass flow of carrier gas which enters the detector to a level consistent with the maintenance of an adequate vacuum. All of the presently available separators, with the exception of the Ryhage jet-orifice type rely on a membrane such as plastic or fritted glass through which the carrier gas (usually hydrogen or helium), and sample components are separated due to a difference in their rates of effusion or permeation. The separators are generally enclosed in a vacuum chamber which must be continuously pumped to insure efficient removal of the separated carrier gas. One limitation common to all of these devices is the loss of some of the sample which invariably accompanies removal of the carrier gas.

A much improved technique which relies on the ability of palladium membranes to totally and selectively remove hydrogen has recently been reported. Ser. No. 852,690, filed Aug. 25, 1969, now U.S. Pat. No. 3,638,396, discloses the use of a palladium membrane for separating carrier gas from the effluent of the column for the purpose of sample enrichment prior to detection and also for the purpose of reducing effluent pressure prior to introduction to a detector, such as a mass spectrometer. Use of a palladium membrane separator in combination with the post column injection of a controlled flow of a second carrier gas, such as helium or a mixture of hydrogen and helium has been disclosed in Ser. No. 852,825, filed Aug. 25, 1969, now U.S. Pat. No. 3,589,171, and Ser. No. 852,770, filed Aug. 25, 1969, now U.S. Pat. No. 3,638,397.

However, these systems still require the use of heavy weight carrier gas cylinders and essential valving to supply and meter the carrier gases to the device. A separate source of carrier gas is obviated in the combined carrier gas generator-separator disclosed in co-pending application, Ser. No. 7,922, filed Feb. 2, 1970, now U.S. Pat. No. 3,690,835, which utilizes a pair of palladium membranes which are immersed in a body of molten, electrolyte capable of transporting hydrogen between the electrodes.

SUMMARY OF THE INVENTION

It has now been discovered according to the invention that the potential difference resistance and the current flow in a cell containing an electrode selectively permeable to carrier gas is dependent on the flow rate of carrier gas through the wall of the electrode. The detectivity of this effect is greatest with compounds reactive with the wall of the electrode and the signal is higher when the flow of carrier gas through the walls of the electrode is less than saturation flow rate. This effect may be utilized to detect pressure, changes in pressure, partial pressure of carrier gas or impurity vapor and in cases of specific impurities which provide large signals, it can be utilized to quantitatively detect the presence of these impurities.

Thus, a single electrolytic cell according to the invention can combine the functions of carrier gas generation, carrier gas separation and detection of impurities. A combination with a gas chromatographic column provides a complete instrument absent the valving and cylinders associated with an external supply of carrier gas, and the controls and separate power supply associated with a separate detector. A complete gas chromatograph can be fabricated on a single chip by etching appropriate recesses for the column and generator-separator-detector and by depositing films of electrode material.

The invention will now become better understood by reference to the following detailed description when considered in conjunction with the accompanying drawings.

BRIEF DESCRIPTION OF THE DRAWINGS

FIG. 4 is a schematic view of a closed circuit chromatograph incorporating a generator-separator-detection device according to the invention;
FIG. 5 is a plan view of an integrated circuit embodiment of the chromatograph-detector system according to the invention;
FIG. 6 is a sectional view taken on the line 6—6 of FIG. 5;
FIGS. 7–10 are schematic representations of sequential process steps to produce a variable cross-section chromatograph column;
and
FIG. 11 is a plain view of an alternate chem-mill maskant pattern for forming a variable cross-section column.

DESCRIPTION OF THE PREFERRED EMBODIMENTS

Figure 1:
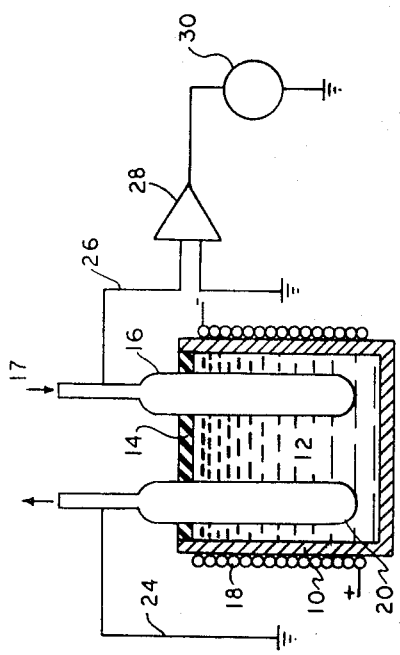
FIG. 1 is a schematic view of a first embodiment of a detector according to the invention.

The detector according to the invention generally includes a pair of electrodes, at least one of which is selectively permeable to carrier gas, a detection circuit and an electrolyte capable of transporting an ionic species of the carrier gas between the electrodes. Referring now to FIG. 1, a simplified detector device comprises a container 10 in which is disposed a body 12 of electrolyte. The container is provided with a lid 14 formed of an electrically insulating material which is stable at the temperature of operating the device.

At least one of the electrodes, suitably the anode 16 is a hollow tubular body formed of a material selectively permeable to the carrier gas. The tubular anode 16 has an inlet 17 for receiving a flow of pure or impure hydrogen carrier gas at a pressure $P_1$. In the case of hydrogen carrier gas, the anode is formed of palladium or one of its hydrogen permeable alloys. An external source of heat such as a heating coil 18 wound around container 10 may be utilized to heat the anode to the temperature at which the anode 16 is permeable to hydrogen and to render the body 12 of electrolyte molten.

The second electrode or cathode 20 may be a source of standard potential such as a calomel or silver/silver chloride reference electrode or may take the form of a hollow tubular body for receiving carrier gas at a pressure $P_2$. An electrical lead 24 is connected to the cathode 20 and a second electrical lead 26 is attached to the anode 16. A detection circuit comprising an ammeter 28 and a recorder 30 are provided in the anode lead 16.

When hydrogen is present in the anode 16 and cathode 20 and the heating coil 10 is energized to heat the anode tube 16 to a temperature at which it is permeable to hydrogen and to melt the electrolyte 12 the device operates as a reverse fuel cell developing a potential difference between the anode 16 and cathode 20. The signal developed is amplified by ammeter 28 and the amplified signal is recorded on recorder 30.

The potential difference is given by the relationship:

$$V = \frac{RT}{F} \ln \cdot \frac{H_1}{H_2}$$

in which:

V is the potential difference in volts;
R is the gas constant;
T is the absolute temperature;
F is the Faraday's constant; and
$H_1$ and $H_2$ are the different carrier gas pressures or concentration of carrier gas in the tubular electrodes. In the case of an impurity the H terms represent partial pressure or concentration of carrier gas.

An initial flow of pure hydrogen carrier gas into the inlet of anode will provide a first reference signal. Introduction of impurity will change the hydrogen partial pressure, $H_1$, and provide a second signal indicative of the quantity of impurity. The impurity will collect in anode tube 16 and can be discarded or further analyzed quantitatively or qualitatively.

Figure 2:
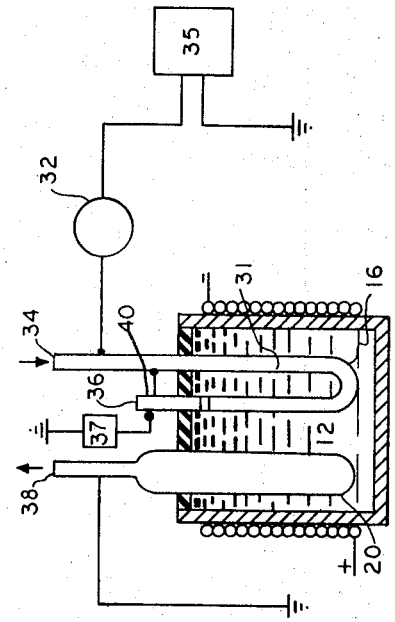
FIG. 2 is a schematic view of a further embodiment of the detector device utilizing applied potential.

A further embodiment of the invention illustrated in FIG. 2 further includes a source of constant potential 32 to form an electrolytic circuit joining the anode 16 and cathode 20. The anode circuit may include a current detector 35. The anode is in the form of an open end tube 31 having an inlet 34 for receiving a flow of impure carrier gas and an outlet 36 for elimination of collected impurity.

Application of a potential from source 32 to the anode 16 and cathode 20 results in hydrogen separation by diffusion through the wall of the anode 16, across the body 12 of electrolyte and through the wall of cathode 20. The impurities collect within the anode tube 16 and are withdrawn through outlet 36 and the hydrogen regenerated in the cathode 20 is removed through outlet 38.

The generator-separator-detector of this embodiment has several unique features. It resides in the combination within an electrolyte of a palladium tube cathode able to generate hydrogen with a palladium tube anode able to return it to the electrolyte. Thus, both electrodes are similar and effectively are both hydrogen electrodes. Hence, the potential of the cell tends to zero. The power needed to generate hydrogen at the cell cathode, recirculate it to the anode and remove it at the anode is very much less than would be required to produce hydrogen by electrolysis. This is because the cell is in a sense a fuel cell operated in reverse. To generate 6.96 cc. of hydrogen per minute by electrolysis requires 1.55 watts. To circulate 6.96 cc. of hydrogen per minute through the generator-separator of FIG. 2, needs only 0.2 watts.

Pure palladium when subject to temperature cycling in the presence of hydrogen, suffers mechanical distortions. However, an alloy of palladium containing 10% to 30% silver, preferably about 25% silver is as permeable to hydrogen and is mechanically stable. Other palladium alloys, for example, palladium-rhodium or palladium-gold alloys may confer more resistance to corrosion to the films and extend the useful life of the generator-separator, but are less permeable to hydrogen. The palladium tube may be provided in various configurations and lengths of tubing may be connected in parallel to provide increased surface area with less flow resistance. Membranes or tubes can also be formed from a base structural material such as a porous ceramic coated with a thin film of palladium or a suitable hydrogen permeable palladium alloy.

The hydrogen flux through a film of palladium for a given hydrogen pressure is dependent on tube geometry, wall thickness and wall temperature. The flux of hydrogen through the wall of a tube heated in air or oxygen to temperatures in the range of 120° C. to 350° C. is 0.1 torr liters sec.$^{-1}$cm.$^{-2}$. The electrolyte provides a convenient oxidizing environment for effecting this pumping. The cell is suitably operated at a temperature of 200° C. to 250° C.

The film may be maintained at a hydrogen permeable temperature by external heating means or by heating the device electrically. As illustrated, the coil 18 may be utilized to raise the temperature of the anode tube 16, cathode tube 20 and electrolyte 12 to a temperature above 200° C.

Though it is desirable to maintain the resistance of the electrodes and electrolyte as low as possible for purposes of electrical power efficiency, the electrolytic cell may in some configurations provide a sufficient internal impedance to produce the desired heating on passage of current through the electrodes and electrolyte. In other configurations, the heat supplied by operation of the electrolytic cell contributes to the heat received to maintain the films at the desired temperature. Thus, the electrolysis current supplied by the potential source 32 may also be utilized to provide a portion of the necessary heating.

The electrolyte is a material capable of transporting an ionic species of the carrier gas from one electrode to the other, is inert with respect to the electrodes, is stable at the temperature of operation and is capable of regenerating the carrier gas by electrolytic association or disassociation as is required. The electrolyte may be an acid, basic or salt material and is preferably an inorganic metal hydroxide.

The most suitable material for use in the invention are the Group I metal hydroxides such as sodium hydroxide, potassium hydroxide, or lithium hydroxide. The hydroxides may be utilized in the unhydrated or hydrated form, suitably containing 10 to 35% water of hydration since this both lowers the power requirement and the temperature at which the electrolyte becomes molten. Improved operation of the cell occurs when at least 10 to 25% of the lighter weight lithium hydroxide is mixed with sodium or potassium hydroxide, preferably the latter. Commercial potassium hydroxide containing 25% water melts at 275° C. The addition of 10% lithium hydroxide to this electrolyte further lowers the temperature at which the electrolyte becomes molten to about 200° C.

The ionic and water content of the electrolyte is also maintained constant during operation. The OH$^-$ ion which is liberated on decomposition of water at the cathode recombines with the H$^+$ ions entering the system to form water which maintains the hydration concentration of the electrolytic cell constant. For this reason, it is preferred to maintain an excess of hydrogen protons in the system at all times to prevent the formation of molecular oxygen which will cause bubbles in the electrolyte and excessive pressure on the thin wall electrode tubes.

When the device is polarized at a fixed potential, preferably from a low impedance source, the current flow in the cell changes as the partial pressure of hydrogen in the anode changes. The detectivity of this effect is the largest when the flow of hydrogen through the walls of anode tube 16 is limited, i.e., when the metal is not saturated with hydrogen. Thus, a separate, higher sensitivity detection circuit can be provided by inserting an electrical insulator sleeve 38, suitably formed of Teflon (polytetrafluoroethylene), to electrically isolate the last segment 40 of the anode. A conductor 41 connects anode segment 40 to the positive terminal of potential source 32. The hydrogen has been essentially depleted at this location and therefore the flow rate through anode segment 40 is below saturation and the signal in current detector 37 is substantially larger than the signal in current detector 35.

The detection mechanism is believed to be a result of throttling of the hydrogen flow to the anode electrode interface resulting from the diminution of hydrogen concentration by the molecules of the detected substance. Another mode of detection is the change in electrical resistance which accompanies the premeation of the metal wall of the anode by hydrogen. This effect, unfortunately, is the least with the palladium-silver alloys which are most commonly available. The conductivity or resistance detector would also observe compounds in terms of the hydrogen they displace in the gas phase or prevent from entering the metal wall of the anode electrode. The gas volume of either type of detector can be as small as a few nanoliters and would be the smallest detectors available suitable for gas chromatography.

Figure 3:
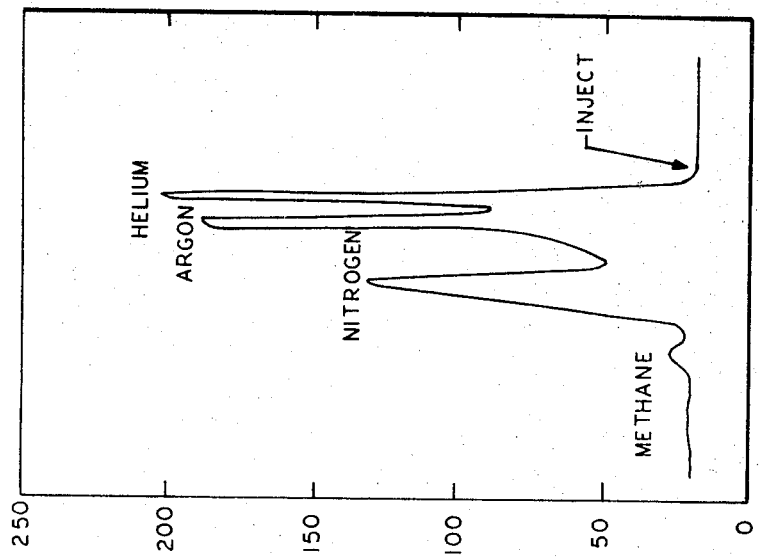
FIG. 3 is a set of chromatograms.

The power of the signals developed is unusually large even for partial pressure effect. FIG. 3 is a chromatogram of a mixture of helium, argon, nitrogen and methane using the cell as a detector. The nitrogen peak for example, represents a deflection of 120 milliamperes. A list of compounds which pass through the palladium-silver tube unaltered is provided in the following table:

TABLE I

Hydrocarbons:
  Hexane
  1-Hexene
  2-Hexene
  Cyclohexane
  Cyclohexene
  Benzene
  2-Methyl, 2-hexene
Alcohols:
  n-Propyl alcohol
  Phenol
  Benzyl alcohol
  Cyclohexanol
Ketones:
  Methyl ethyl ketone
  Cyclohexanone
  Acetophenone
  Furan
  2,4-Pentanedione
Ethers:
  Diethyl ether
  Tetrahydrofuran
  Anisole
Aldehydes:
  Propionaldehyde
  Furfural
  Benzaldehyde Esters:
  Ethyl acetate
  Methyl laurate
Nitrogen compounds:
  Methyl amine
  Benzonitrile
  Phenyl acetonitrile
  Pyrrole
  Pyridine
  Ethanenitrile
Sulfur compound:
  Thiophene
Halogen compounds:
  Butyl chloride
  Chlorobenzene
  Perfluoropentane
Gases:
  Carbon dioxide
  Carbon monoxide
  Methane
  Helium
  Argon
  Nitrogen
  Nitric oxide
  Nitrogen dioxide
  Nitrous oxide The inner surface of the heated palladium tube is catalytic to many substances which react therewith with development of even larger signals. Examples of such compounds are reducible compounds as listed in the table below:

TABLE II

| Starting compounds | Hydrogenated product | Percent |
|---|---|---|
| Acrolein | Proprionaldehyde | 96.7 |
| Acrylonitrile | Propanenitrile | 96.1 |
| Methyl acrylate | Methyl propanoate | 97.5 |
| Methyl vinyl ketone | Methyl ethyl ketone | 92.1 |
| Isoprene | 2 methyl, 1-butene | 93.0 |
| 2,4-hexadiene | Hexene | 97.2 |
| 1,5-hexadiene | do | 87.2 |
| Styrene | Ethyl benzene | 95.0 |
| Acetylene | Ethylene plus polymers | 90.0 |
| Oxygen | Water | 99.0 |

The largest signals are developed on passage through the anode-separator tube of compounds which reversibly adsorb or poison the catalytic activity of the palladium surface such as carbon monoxide, nitrous oxide, and sulfur containing gases such as hydrogen sulfide, sulfur dioxide, and mercaptans; and iodine compounds such as ethyl iodide. The characteristic deflection of these peaks can be utilized to qualitatively detect the presence of particular compounds. A threshold sensor may be incorporated in the detector for this purpose. Coincidentally, the reactive detectable compounds happen to be major constituents of air pollution and thus the detector of the invention is unusually suitable for air pollution detection and control.

Concentrations of less than 500 p.p.m. of the sulfur containing gases in the carrier streams caused temporary poisoning of the surface in one experimental device. Higher concentrations caused progressive loss of hydrogen separation efficiency and repeated injections of these compounds at a concentration of 5000 p.p.m. may render the separator inactive. Activity can be restored by heating the separator anode to 500° C. for several hours. Palladium-gold alloys are less susceptible to poisoning by sulfur compounds but are generally less permeable to hydrogen.

The flow of hydrogen from the cathode can be turned on, controlled or stopped simply by analogous changes in the current supplied to the cell. Storage cylinders, gas purifiers, flow and pressure regulators are all unnecessary. The anode can function as a transmodulator or a mass spectrometer separator if desired. The cathode can generate hydrogen pressures up to at least 500 p.s.i. so that all the needs of a gas chromatograph column in terms of flow and pressure can readily be met without the need for pneumatic control valves. Procedures such as flow or pressure programming can be effected from electrical analogue instructions externally impressed on the cell. In addition, the usual disadvantages of flow and pressure programming namely their adverse effect on detector performance due to large changes in carrier gas flow rate are not a problem.

When combined with a gas chromatograph preferably in a closed loop many other advantages are realized. The cell can replace the conventional gas chromatograph detector. Since the electrolytic cell also functions as a carrier gas generator and separator, all that is required to complete a gas chromatograph is the column, a sample inlet and suitable valving. Such a system is illustrated in FIG. 4.

The system generally includes a generator-separator-detector cell 50, a gas chromatograph column 52; a current indicator 54 and suitable valving, piping and wiring. The cell 50 comprises a container 56 suitably formed of Teflon (polytetra-fluoroethylene) having a lid 58. A body 60 of electrolyte is received within the container 56 and a heating coil 62 suitably a Nichrome wire heating element, surrounds the side wall of the container 56. A tubular cathode 64 having a closed bottom 66 is immersed in the electrolyte 60. An anode in the form of a helical coil 68 is supported symmetrically around the cathode 64 by means of insulating spacing strips 70, suitably formed of Teflon. The anode 68 and cathode 64 are mounted through apertures in the Teflon lid 58.

External connections are made to the palladium tubes by brazing with pure silver in a hydrogen atmosphere. It is important to ensure that no metal, other than palladium alloy or the noble metals is in contact with the electrolyte. The performance of the cathode is impaired if other metals are electrolytically deposited upon its surface; iron and nickel appear to be particularly detrimental in this respect.

The electrolyte used was KOH 67.5%, LiOH 10.0% and water 22.5% and was made by adding 10 gms. of LiOH to 90 gms. of KOH pellets, containing 25% water. This mixture could be used over the temperature range 160° to 250° C., usually 230° C. The LiOH served to lower the melting point, particularly at the cathode surface where water is removed by electrolysis and solid sheaths of KOH might otherwise tend to form. Before it was added to the cell, the electrolyte was electrolyzed between platinum electrodes at 0.01 amperes for 8 hours to remove traces of ferrous and other metals.

The cathode electrode 64 is connected to the negative terminal of a low impedance, constant potential source 74 and the anode electrode 68 is connected through a current measuring and recording device 76, suitably an electrometer amplifier and a potentiometer recorder, to the positive terminal of source 74. Higher efficiency and reduced electrolytic conversion are provided by electrically joining the inlet and outlet of the anode so that the effective length of the anode tube along which the electrical current must flow is halved.

A chromatograph column 52 is connected across the node 68 and cathode 64 such that the outlet 80 of the column communicates with the inlet 82 to the anode 68 and the outlet 84 of the cathode communicates with the inlet 86 to the column. A sample inlet branch conduit 88 contains a valve 90 and is disposed in the line 92 joining the cathode outlet 84 and column inlet 86.

The column 52 consists of a series of reactants which segregate the gas sample by affecting the rate at which the different constituents of the gas sample flow through the column to provide an effluent containing a sequential passage of the constituents.

The device is operated by energizing the power source, preferably to a power level of less than about 0.6 volts for the present configuration and energizing the coil 62 to heat the electrolyte to a temperature of about 230° C. Hydrogen carrier gas within the anode 68 is transferred through the wall of the anode, across the electrolyte 60 and through the wall of the cathode and collects within the cathode 64.

When sufficient pressure is developed in the cathode 64, the hydrogen carrier gas flows through line 92 and sweeps past branch conduit 88 and draws sample through valve 90. The carrier gas propels the sample-carrier gas mixture through the column 52. The effluent leaves the column through outlet 80 and enters the inlet 82 of the anode 68. Most or all of the hydrogen is removed through the anode tube wall and collects in cathode 64 for recycling to the column 52. The current flow through the cell as indicated on recording device 76 drops when a sample constituent emerges in the effluent from the column 52 and enters the anode 68.

The invention further renders possible the construction of a microminature gas chromatograph in which all the elements including the column could be formed on a small chip which need not be over 1 cm. by 2 cm. in overall size, utilizing techniques well established in fabrication of microelectronic and integrated circuit devices.

Referring now to FIGS. 5 and 6, the device is formed on a pair of planar chips 100 and 102 of a material which is impervious to gas, preferably has high electrical resistance, is a good thermal insulator, is resistant to attack by the molten electrolyte and is stable at the temperature of operating the device. Suitable materials are refractory metal oxides such as magnesium oxide or high temperature, inert plastics such as Teflon (polytetrafluoroethylene). The various recesses and channels may be formed by conventional machining or etching techniques. The planar surface may be covered with a film of chem-mill maskant. Portions of the film are cut and peeled to expose the surface areas to be etched to form the recesses. After removal from the etchant bath, the remainder of the film is stripped from the surface of the chip.

The device contains a column section 104, an electrolytic cell section 106, which are joined by a sampler section 108. The column section 104 is an elongated channel 110 which has been folded to conserve space. The inside surface of the channel may be lined with a film 112 of adsorbent or retardant, either liquid or solid, suitably a molecular sieve or a silicone oil. The inlet 114 to the column communicates with the outlet conduit channel 116 from the sampler section 108. The outlet channel 119 of the column delivers the column effluent to the inlet 144 to chamber 142 of the cell 106.

The sampler section comprises a fixed volume recess forming a chamber 118. The outlet conduit channel 116 also communicates with sample inlet port 120 through sample valve 122. To load the chamber 118, the hydrogen in it is removed by reversing the polarity to the cell 106 in a brief large pulse. The sample valve 122 is opened and sample drawn into the chamber 118 and the sample valve is then closed. The inlet 124 to the sample chamber 118 is connected to the output of the cathode compartment 154.

The cell includes a folded recess forming an electrolyte compartment 128 containing a body of electrolyte 130. The outside surface of the electrolyte compartment is formed by a first film 132 of palladium-silver alloy. The first portion of the film up to an insulating spacer 134 functions as the separator anode. The second portion functions as the detector anode 136.

The anode film 132 may contain a tongue projection 138 on each end thereof which is fitted and sealed into grooves 140 formed in the chips 100 and 102 adjacent the compartment 128. An anode chamber 142, surrounds the anode film 132. The anode chamber 142 is defined by the outside surface of the anode film 132 and the opposing wall surfaces of the chips 100, 102. The inlet 144 of the anode chamber 142 receives the effluent from the outlet channel 119 of the column 110. The outlet from the anode chamber 142 is exhausted through a vertical vent aperture 146 provided at the outlet end 148 of the anode chamber 142.

The inner wall of the electrolyte compartment 128 is formed by a second film 152 of palladium-silver alloy which functions as the cathode. A cathode chamber 154 is provided adjacent the outside surface of film 152, and opposing surfaces of recesses formed in the chips 100, 102. The outlet of the cathode chamber 154 is connected to the inlet 124 to sampler chamber 118. The palladium-silver films may be preformed and installed into the grooves or may be formed in situ utilizing vacuum deposition or photo-etching techniques.

A separator anode lead 160 and cathode lead 162 connect the separator anode 132 and cathode 152 respectively to the positive and negative terminals of a constant potential, low impedance power source 170. A detector lead 164 connects the detector anode 136 to an indicator 166.

A heat source for the device may be provided by means of strips 168 of high resistance metal vacuum deposited onto at least the bottom surface of chip 100 and connected to a power source and controller not shown. After the appropriate channels are formed in chips 100, 102, they are assembled by applying sealant to exposed original planar surfaces to bind the chips together and to form gas tight seals for the various recesses, channels and compartments.

The continuous circuit for operation is similar to that described with respect to FIG. 4. The introduction of sample has been discussed. On application of normal polarity to the cell section 106 hydrogen produced in the cathode compartment 154 will enter the sample chamber 118 and sweep the sample through column 110. The effluent from the column 110 will enter the anode compartment 142 and hydrogen will be separated by diffusion through anode film 132, electrolyte 130 and cathode film 152 and will collect in cathode chamber 154. The hydrogen will be substantially depleted by the time it reaches the detection anode 136 and a large signal will be detected on indicator 166. Impurity vapor is exhausted through vent aperture 146.

Since the column could be produced on the chip by methods available from the integrated circuit, or chem-mill art, it would be possible to form a column having any desired cross-sectional configuration. This would make it possible to devise the capillary column in a configuration which would provide the advantages of flow programming without changing temperature or flow rates. This could be accomplished by providing a variable cross-section which increases or decreases with distance along the column in accordance with a predetermined relationship. The column would then produce a chromatogram having peaks distributed linearly in time. In contrast the uniformly cross-sectioned, conventional column produces peaks distributed logarithmically.

Since this advantage is feasible using microminiature techniques, it follows that the same techniques could be utilized, on a larger scale, to fabricate a column on a larger substrate, having a cross-section varying as mentioned. Thus, it would be possible to fabricate columns for conventional gas chromatographs having unique cross-sectional configurations which are now not feasible either technically or economically to produce from metal tubing.

Referring now to FIGS. 7–11, differential etching techniques may be utilized to form variable cross-section columns. In FIG. 7, a planar chip 200 of etchable material is coated with a peelable film 202 of chem-mill maskant, such as the diene elastomer materials described in U.S. Pats. Nos. 2,888,335, 3,079,352 and 3,227,589. Scribe lines 204 are cut in the film 202 on the top surface of the chip 200 in the form of uniformly tapering and converging lines. The interior V-shaped portion 206 of film 202 is peeled and stripped from the surface.

In FIG. 8, the chip is exposed to an etchant solution, 208, suitably an acid in the case of magnesium oxide. The etchant differentially etches the chip to form a semi-conical diverging channel 210 as shown in FIGS. 9 and 10. Two mating chips so processed are joined to form a column.

A further form of a variable cross-section chromatograph column is illustrated in FIG. 11. The scribe lines 204 define a series of decreasing diameter column lengths. When processed by differential etching, the exposed portion within the scribe lines will form a correspondingly shaped column.

It is to be understood that only preferred embodiments of the invention have been described and that numerous substitutions, modifications and alterations are all permissible without departing from the spirit and scope of the invention as defined in the following claims.

What is claimed is:

1. An electrolytic cell comprising:
   a unitary electrical insulator body formed of a pair of planar chips of a material impervious to gas having good thermal insulation character and resistant to attack by electrolyte, one face of each of said chips containing opposed recesses, which faces are sealingly joined defining a chamber;
   an anode film and a thode film selectively permeable to a carrier gas, said films being sealingly received in the walls of said chamber spaced from opposed end walls of the chamber defining therebetween a closed electrolyte reservoir for receiving a body of electrolyte capable of transporting an ionic species of the carrier gas between said films and defining between the anode film and a first end wall a first compartment for receiving a flow of said carrier gas for separation through said anode film and defining between said cathode film and a second end wall a second compartment for collecting carrier gas regenerated through said cathode film;
   inlet means extending from an outside surface of the body through said body to said first compartment for delivering impure carrier gas to said first compartment;
   first outlet means extending from said first compartment to an outside surface of the body for removing impurities therefrom;
   second outlet means connected to said second compartment; and
   recycle means extending through said body connecting said second outlet means with said inlet means.

2. A cell according to claim 1 in which said carrier gas comprises hydrogen and said films comprise palladium.

3. A cell according to claim 1 in which said material is selected from refractory metal oxides and inert high temperature plastics.

4. A cell according to claim 3 in which the material is a refractory metal oxide and said recess and recycle means are formed by selectively etching said material.

5. A method of fabricating an electrolytic gas transfer cell comprising the steps of:
   forming a first recess in a surface of a first body of electrically insulating material that is impervious to gas, has good thermal insulation properties and is resistant to electrolyte;

forming a second mating recess in a surface of a second body of said material;

sealingly joining said surfaces to form a unitary device including an interior closed chamber formed of said recesses;

sealingly installing an anode electrode film across said chamber spaced from a first end wall to define a first compartment and sealingly installing a cathode electrode film across said chamber spaced from a second end wall of said chamber to define a second compartment between said cathode film and second end wall and a closed electrolyte reservoir between said films; at least one of said films being selectively permeable to carrier gas;

forming a carrier gas inlet extending from an outside surface of the device to said first compartment;

forming an impurity gas outlet extending from the first compartment to an outside surface of the device;

forming a second outlet to said second compartment;

forming a gas passage extending through said device and connecting said second outlet to said inlet;

filling said chamber to a level sufficient to wet both of said electrodes with an electrolyte capable of transporting an ionic form of said carrier gas between said films; and applying electrical contacts to said films.

6. A method according to claim 5 in which said material is selected from refractory metal oxides and inert high temperature pastics.

7. A method according to claim 6 in which the material is a refractory metal oxide and said recess and passage are formed by selectively etching said material.

References Cited

UNITED STATES PATENTS

| 3,586,435 | 6/1971  | Del Carlo et al. | 204—129 X |
| 3,475,302 | 10/1969 | Langer et al.    | 204—129   |
| 3,586,617 | 6/1971  | De Luccia        | 204—129 X |
| 3,761,382 | 9/1973  | Hammond et al.   | 204—129 X |

JOHN H. MACK, Primary Examiner

D. R. VALENTINE, Assistant Examiner

U.S. Cl. X.R.

96—36; 156—12; 204—1 T, 129, 195 R, 278, 293, DIG. 3

UNITED STATES PATENT OFFICE
CERTIFICATE OF CORRECTION

Patent No. 3,836,449            Dated September 17, 1974

Inventor(s) James E. Lovelock

It is certified that error appears in the above-identified patent and that said Letters Patent are hereby corrected as shown below:

Column 3, line 28, "plain" should read --plan--. Column 8, line 2, "node" should read --anode--. Column 10, line 40, "thode" should read --cathode--. Column 12, line 6, "pastics" should read --plastics--.

Signed and sealed this 19th day of November 1974.

(SEAL)
Attest:

McCOY M. GIBSON JR.             C. MARSHALL DANN
Attesting Officer               Commissioner of Patents